(12) United States Patent
Jacob et al.

(10) Patent No.: US 10,659,600 B2
(45) Date of Patent: May 19, 2020

(54) CALL TRAFFIC DIAGNOSTICS IN TELECOMMUNICATIONS NETWORKS

(71) Applicant: DONOMA INC., Blacksburg, VA (US)

(72) Inventors: Beena Jacob, Tampa, FL (US); Michael John Barry, Blacksburg, VA (US)

(*) Notice: Subject to any disclaimer, the term of this patent is extended or adjusted under 35 U.S.C. 154(b) by 0 days.

(21) Appl. No.: 16/604,835

(22) PCT Filed: Apr. 13, 2018

(86) PCT No.: PCT/US2018/027544
§ 371 (c)(1),
(2) Date: Oct. 11, 2019

(87) PCT Pub. No.: WO2018/191651
PCT Pub. Date: Oct. 18, 2018

(65) Prior Publication Data
US 2020/0084316 A1 Mar. 12, 2020

Related U.S. Application Data

(60) Provisional application No. 62/485,109, filed on Apr. 13, 2017.

(51) Int. Cl.
*H04M 3/22* (2006.01)
*H04M 3/42* (2006.01)
*H04M 3/51* (2006.01)
*H04M 3/36* (2006.01)

(52) U.S. Cl.
CPC ....... *H04M 3/2254* (2013.01); *H04M 3/2218* (2013.01); *H04M 3/2227* (2013.01); *H04M 3/36* (2013.01)

(58) Field of Classification Search
None
See application file for complete search history.

(56) References Cited

U.S. PATENT DOCUMENTS

| | | | |
|---|---|---|---|
| 6,058,163 A | 5/2000 | Pattison et al. | |
| 6,249,570 B1 | 6/2001 | Glowny et al. | |
| 6,542,602 B1 | 4/2003 | Elazar | |
| 2010/0173618 A1* | 7/2010 | Kass | H04M 3/42221 455/414.1 |

* cited by examiner

*Primary Examiner* — Harry S Hong
(74) *Attorney, Agent, or Firm* — Craig A. Fieschko, Esq.; DeWitt LLP (57) ABSTRACT

Telephone calls within one or more telephone networks (or portions thereof) are animated in real time as they occur, or over some past period in real time or at a user-selected speed. Each animated call displays the call's progress from its first connection to its final disconnection, along with intervening connection delays and transition events (e.g., transfers, holds, conferences, etc.). Animated display of multiple concurrent calls allows network administrators to easily and intuitively diagnose telephone network issues and more easily devise solutions, particularly where such display is provided in combination with concurrent measures of telephone network efficiency.

20 Claims, 9 Drawing Sheets

| DATE TIME ORIGINATION | DATE TIME CONNECT | DATE TIME DISCONNECT | CALLING PARTY NUMBER | TERMI-NATING NUMBER | FINAL TERMI-NATING NUMBER | DURATION | GLOBAL CALL ID | ORIG CALL ID | DEST CALL ID |
|---|---|---|---|---|---|---|---|---|---|
| 10:30:01 AM | 10:30:11 AM | 10:32:43 AM | 5405256816 | 2389 | 2389 | 0:02:32 | 1 | 11 | 111 |
| 10:32:43 AM | 10:32:48 AM | 10:36:15 AM | 5405256816 | 5026 | 5026 | 0:03:27 | 1 | 11 | 112 |
| 10:32:21 AM | 10:32:26 AM | 10:32:56 AM | 5401233456 | 2345 | 6000 | 0:00:30 | 2 | 12 | 113 |
| 10:34:03 AM | 10:34:07 AM | 10:34:29 AM | 7275256816 | 6108 | 6000 | 0:00:22 | 3 | 13 | 114 |
| 10:34:29 AM | 10:34:44 AM | 10:37:06 AM | 2774 | 4261 | 4261 | 0:02:22 | 3 | 14 | 115 |
| 10:37:06 AM | 10:37:06 AM | 10:38:33 AM | 7275256816 | 3472 | 3472 | 0:01:27 | 3 | 13 | 116 |
| 10:38:33 AM | 10:38:33 AM | 10:43:34 AM | 3472 | b0010000 | b0010000 | 0:05:01 | 3 | 116 | 117 |
| 10:38:33 AM | 10:38:33 AM | 10:43:34 AM | 7275256816 | b0010000 | b0010000 | 0:05:01 | 3 | 13 | 117 |
| 10:38:33 AM | 10:38:33 AM | 10:43:34 AM | 4352 | b0010000 | b0010000 | 0:05:01 | 3 | 15 | 117 |
| 10:35:01 AM | 10:35:11 AM | 10:45:43 AM | 8016259816 | 2389 | 2389 | 0:10:32 | 4 | 16 | 118 |

INCOMING CALL CONNECTED: (540) 525-6816 📞 10:30:01 AM

FIRST CALL SEGMENT COMPLETE: 10 SEC | 2389 00:02:32 | 5 SEC | 00:01:00

INCOMING CALL CONNECTED: (540) 525-6816 📞 10:30:01 AM

FIRST CALL SEGMENT COMPLETE: 10 SEC | 2389 00:02:32 | 5 SEC | 00:02:00

INCOMING CALL CONNECTED: (540) 525-6816 📞 10:30:01 AM

FIRST CALL SEGMENT COMPLETE: 10 SEC | 2389 00:02:32 | 5 SEC

SECOND CALL SEGMENT COMPLETE: 5026 00:03:27

| (801) 625-9816  10:35:01 AM | 10 SEC | 2389  00:10:32 | | | ↷ 2389  10:45:43 AM |

| (913) 565-6666  10:38:01 AM | 6 | 3565  00:21:53 | | ↶ 3565 |

| (800) 333-1234  10:59:58 AM | | ↶ 9356 |

| (540) 525-6816 | 10 | 2389 | 5 | 5026 |  | 5026 |
| 10:30:01 AM | SEC | 00:02:32 | SEC | 00:03:27 |  | 10:36:15 AM |

| (913) 565-6666 | 6 | 3565 | 3565 |
| 10:38:01 AM |  | 00:21:53 | |

| (540) 525-6816 | 10 | 2389 | 5 | 5026 |  | 5026 |
| 10:30:01 AM | SEC | 00:02:32 | SEC | 00:03:27 |  | 10:36:15 AM |

| (913) 565-6666 | 6 | 3565 | 3565 |
| 10:38:01 AM |  | 00:21:53 | |

| (800) 333-1234 | | 3565 |
| 10:59:58 AM | | |

| (800) 333-1234 | | 5653 |
| 10:59:58 AM | | |

FIG. 6C

CALL TRAFFIC DIAGNOSTICS IN TELECOMMUNICATIONS NETWORKS

CROSS-REFERENCE TO RELATED APPLICATIONS

This application claims priority under 35 USC § 119(e) to U.S. Provisional Patent Application 62/485,109 filed 13 Apr. 2017, the entirety of which is incorporated by reference herein.

FIELD OF THE INVENTION

This document concerns an invention relating generally to telecommunications, and more specifically to measuring and monitoring of telecommunications efficiencies.

BACKGROUND OF THE INVENTION

Figure 1:
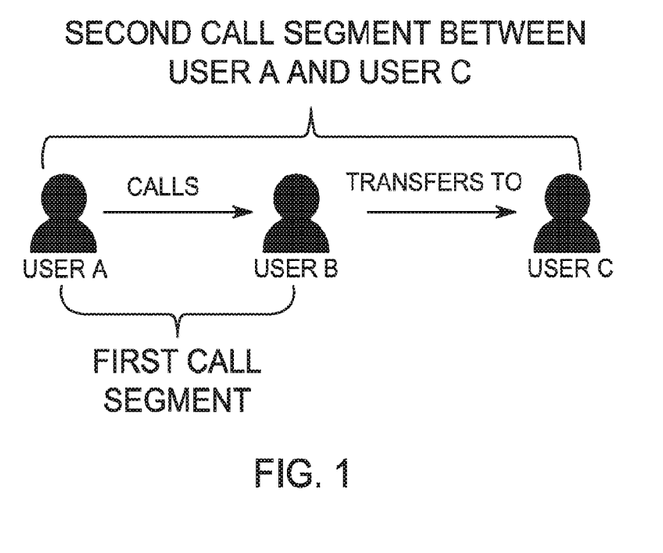
FIGS. 1 and 2 schematically illustrate call segments which might occur between the addresses of Users during exemplary telephone calls.
Figure 2:
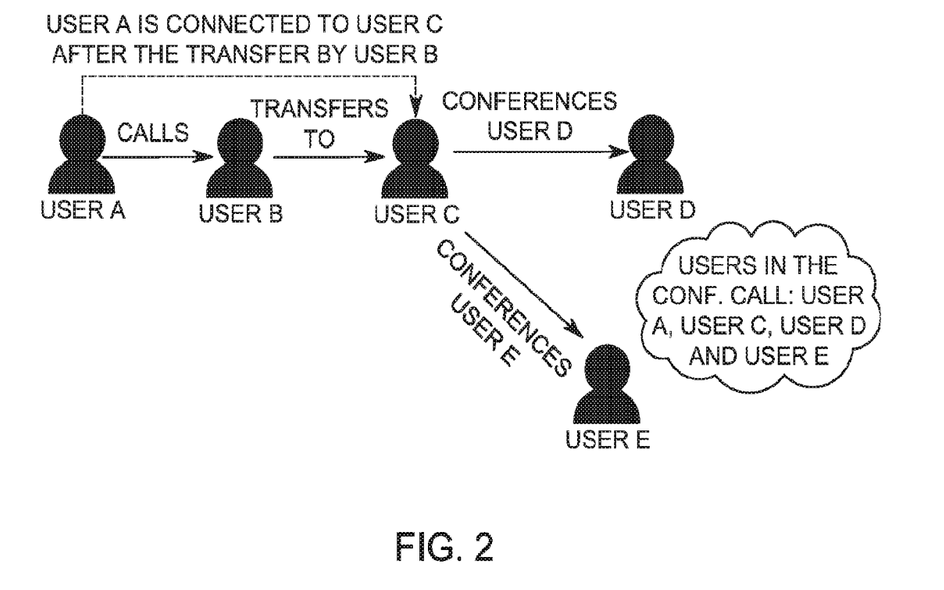
Figure 3:
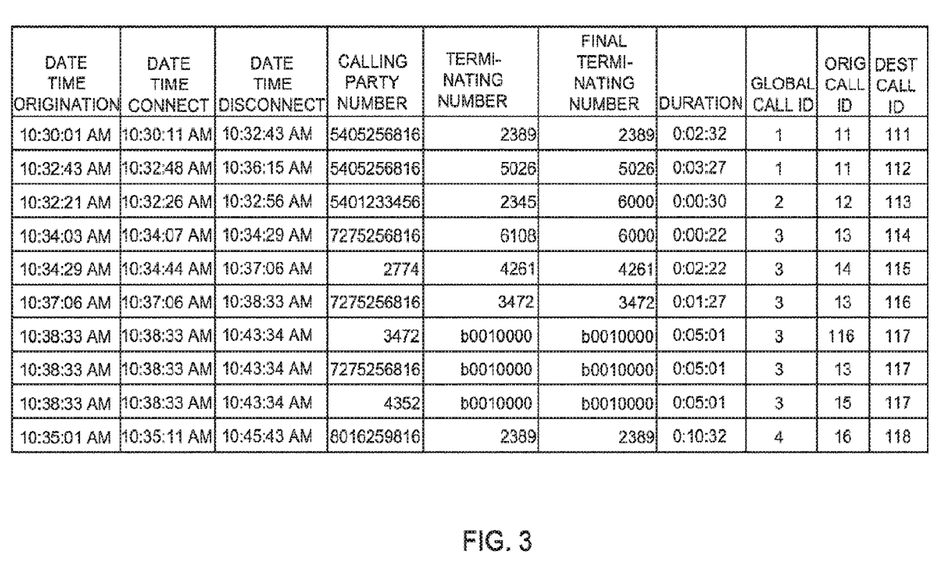
FIG. 3 illustrates an exemplary display of call data that might be seen by a telephone network administrator for four exemplary telephone calls.

It can be difficult to determine specifics of the operational status of telephone networks, such as PBX networks (Private Branch Exchange networks, i.e., private telephone networks within an organization) or PSTNs (public switched telephone networks), owing to their complexity. In current telephone networks, calls typically transition through various states such as: call transfer, a mechanism enabling a user to relocate an existing telephone call to another address (e.g., another telephone, voicemail box, or other destination); conference, a telephone call wherein a user is connected to several other addresses at the same time; call forward, the redirecting of a telephone call to another address; voicemail, a system for storing messages from callers; hunt group, a system for distributing phone calls addressed to a single telephone number to a group of several addresses telephones; call (attendant) handlers, automated greeters which provide menus of selectable options and route calls accordingly; group pickup, a system allowing users to receive calls incoming to one or more groups; Direct Inward Dialing (DID), a system providing a block of telephone numbers for calling into an organization's private telephone network; and call terminated, among other states. While an original call— i.e., a call initiated within, or incoming to, a telephone network—maintains a unique identifier (its Global Call ID) as it works its way through the telephone network and transitions from one state to another, telephone networks typically log each transition from one state to another as a separate call, creating complexities that hinder monitoring of the networks' operational status and "health." As a simple illustration, consider the scenario illustrated schematically in FIG. 1: Within a telephone network, User A calls User B. User B answers the call, talks for X seconds, and then transfers the call to User C. User A is connected to User C, talks for Y seconds, and then disconnects the call. The telephone network logs this scenario as two separate calls, one call prior to the transition (transfer) and one call afterward. This segmenting of a single original call from User A into two calls can make it difficult for a telephone network administrator to trace a call from origination to destination. Difficulties are compounded where the telephone network may have far more users, and far more complex transition scenarios; it is not uncommon for an original call to be registered as dozens of calls (call segments), particularly if hunt groups or conferences are involved. FIG. 2 schematically illustrates a slightly more complex scenario where User A calls User B; User B then transfers User A to User C; User C then conferences User D into the call with Users A and C; and User C then conferences User into the call with Users A and C. A telephone network will typically log this as five separate calls: (1) call from User A to User B; (2) call from User A to User C; (3) call from user C to conference bridge number; (4) call from user D to conference bridge number; and (5) call from user. E to conference bridge number. This segmenting of the original call makes it difficult to monitor a telephone network for issue diagnosis and optimization. FIG. 3 shows another example illustrating call data for four original calls, as such data might be presented to a telephone network administrator. Each of the depicted lines in FIG. 3 represents one of the call segments from one of the four original calls, i.e., the table shows that the four original calls were logged as ten call segments. "DateTime Origination" is the time when a call is initially attempted; "DateTime Connect" is the time when the call connected (the call segment start time), which is the same as DateTime Origination if the ring time duration is zero; "DateTime Disconnect" is the time when the call was disconnected (the call segment end time), which is same as DateTime Connect if no connection was made; "Calling Party Number" is the address (e.g., phone number) of the originator of the original call; "Terminating Number" is the address of an intended recipient of a call segment; "Final Terminating Number" is the address of the actual recipient of a call segment (for example, where User A calls User B, but User B does not answer and connects User A to voicemail, the Terminating Number is User B's address and the Final Terminating Number is the voicemail address); "Duration" is the difference between DateTime Disconnect and DateTime Connect (i.e., the duration of the call segment); "Global Call ID" is a unique identifier assigned to the original call; "Orig Call Identifier" is a unique identifier assigned to the caller; and "Dest Call Identifier" is a unique identifier assigned to the intended recipient of a call segment. Owing to the bulk of the data presented, it is difficult to trace a call from its origination to its final termination, and significant experience is required to spot data patterns that may indicate bottlenecks or other problems (if such problems can be spotted at all).

Telephone network administrators often seek to optimize their telephone networks for optimal call handling. This is critical in, for example, a call center, whose profitability typically depends on efficiently making as many calls as possible. It would therefore be beneficial for network administrators and other personnel to have means available for easily reviewing and analyzing call histories, allowing them to diagnose actual and potential problems and their causes.

SUMMARY OF THE INVENTION

The invention involves systems (i.e., methods and devices) for monitoring and measuring the operational health of a telephone network which at least partially solves the aforementioned problems. To give the reader a basic understanding of some of the advantageous features of the invention, following is a brief summary of preferred versions of the system, with reference being made to the accompanying drawings (which are briefly reviewed in the following "Brief Description of the Drawings" section of this document) to assist the reader's understanding. Since the following discussion is merely a summary, it should be understood that more details regarding the preferred versions may be found in the Detailed Description set forth elsewhere in this document. The claims set forth at the end of this document then define the various versions of the invention in which exclusive rights are secured.

The system utilizes conventional call data, such as that shown in FIG. 3, to provide an interface allowing telephone network administrators, human resource administrators, and others to readily visualize telephone usage and call traffic, diagnose telephone network "health" and determine actual or potential problems, and devise solutions. The system may be implemented as software or other machine-readable instructions executable in conventional telephone network equipment, in a general purpose computer (preferably as a web browser-based application), or another programmed or programmable device, such as an application specific integrated circuit (ASIC) or programmable logic device (PLD), or other programmed or programmable device.

Preferably, for each telephone call within the telephone network, the system compiles at least some of the call data of FIG. 3, or other call data defining characteristics of a telephone call (an original call having a unique global call ID) and its call segments. Preferably, such data includes the Global Call ID, the address of the telephone call initiator (Calling Party Number in FIG. 3), the address at which the telephone call terminates (Final Terminating Number in FIG. 3), the call segment start time (DateTime Connect in FIG. 3), the call segment end time (DateTime Disconnect in FIG. 3), and the address of the call segment recipient (Terminating Number in FIG. 3). The call segments of the telephone call are then displayed in succession over time on a monitor (an electronic display), in a linear array, in the order in which the call segments occurred within the telephone call, thereby animating the progression of the telephone call. An example of such display is schematically depicted in FIGS. 4a-4j, wherein these figures show the progressive construction of a depiction of a telephone call and its call segments, with the completed call being shown in FIG. 4j. Each call segment is preferably represented by an element (i.e., a shape or space having a discrete length along the linear array, such that its borders along the array are visually discernable), with the call segment elements being shown as rectangles throughout the accompanying drawings (more particularly, in FIGS. 4a-4j, 5, and 6). Each element has a length oriented along the linear array which increases as the animation of the telephone call progresses, until it reaches a final length proportional to the duration of the call segment represented by the element. Thus, looking to FIG. 4j as an example, a telephone network administrator can readily visualize the duration of each call segment within the telephone call by looking at its length along the array. The call segment elements also preferably display additional information regarding the call segment; for example, looking to the first call segment element in FIGS. 4a-4j, prior to its completion, it displays the call segment's current duration (see FIGS. 4e-4f), and after completion, it illustrates the call segment's total duration and the address of its recipient (see FIGS. 4g-4j). Call segment elements might illustrate other or additional information; for example, if a user clicks on, hovers a cursor over, or otherwise selects the first call segment element in FIGS. 4a-4j, the call segment start time, call segment end time (if yet available), call status identification (if yet available, i.e., call in progress or call complete), prior transition (e.g., Transfer, Conference, etc.), call quality information. (if yet available, e.g., latency, jitter, packet loss, and Mean Opinion Score), and/or call segment cost (if yet available) might be displayed within or adjacent the element. The content of the call segment might also be provided via audio playback and/or via text (as produced by voice recognition routines). As discussed below, additional information might be conveyed by an element's color or fill pattern, border thickness or line type, shape, or image consistency (i.e., static appearance versus pulsing/flashing or otherwise fluctuating), and/or by any icons associated with the element; for example, an element's color, fill pattern, etc. might change as its call segment progresses from in-progress to completed.

Other details of the telephone call are preferably also included in the animation. As a first example, the telephone call illustrated in FIGS. 4a-4j includes an exemplary caller element which appears prior to the display of the first call segment element in the array, with the call segment elements in the array thereafter being displayed in succession following the caller element. The exemplary caller element of FIGS. 4a-4j displays an address identifying the initiator of the telephone call, as well as the origination time of the telephone call, and also changes its color when connection is made and the first call segment begins (between FIGS. 4e and 4d).

As a second example, the telephone call illustrated in FIGS. 4a-4j includes exemplary delay elements which each represent delays which may occur prior to or following a call segment (i.e., during transitions), such as telephone ring time and telephone transfer time (e.g., the time needed to transfer/connect from address-to-address, to a hunt group member, or to a conference). Such delay elements can therefore be shown along the linear array prior to each call segment element representing a call segment preceded by telephone ring time, and following each call segment element representing a call segment followed by telephone transfer time. As the animation of the telephone call progresses, the length of each delay element along the linear array preferably grows in proportion to the transition time represented by the delay element; see, e.g., the growth of the ring time delay element in FIGS. 4a-4e as the telephone at address (extension) 2389 rings, until connection is made in FIG. 4d. Thus, analogous to the animated growth of the call segment element(s) in FIG. 4e onward, a telephone network administrator is visually and intuitively provided with information regarding the transition delays that occurred between connections in the telephone call.

Figure 4A:
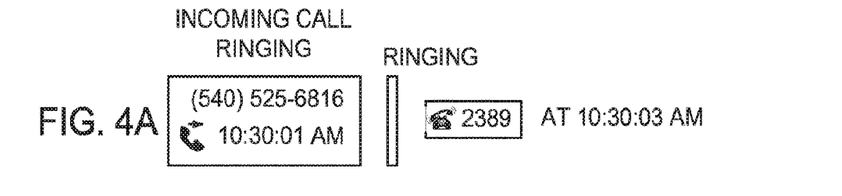
FIGS. 4a-4j schematically illustrate the progressively changing appearance of an animated depiction of an exemplary telephone call and its call segments, as might be provided by the invention.
Figure 4B:
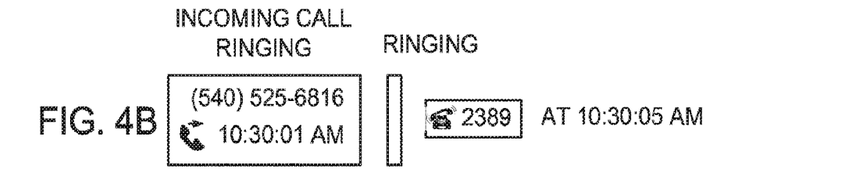
Figure 4C:
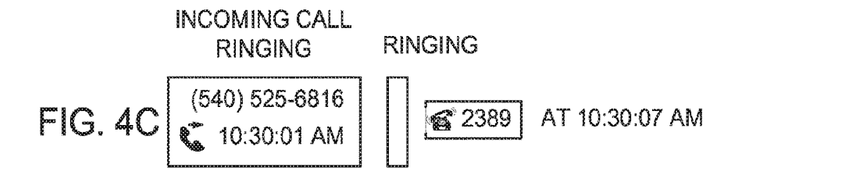
Figure 4D:
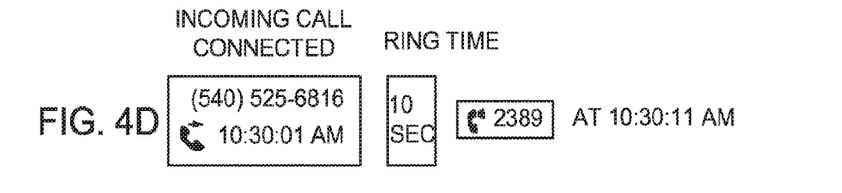
Figure 4E:
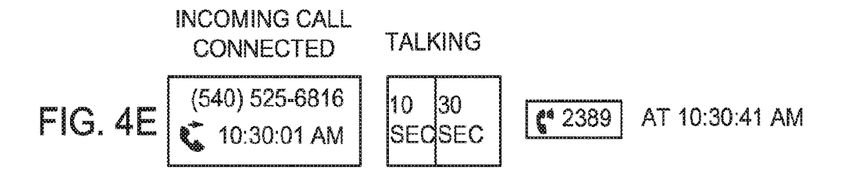
Figure 4F:
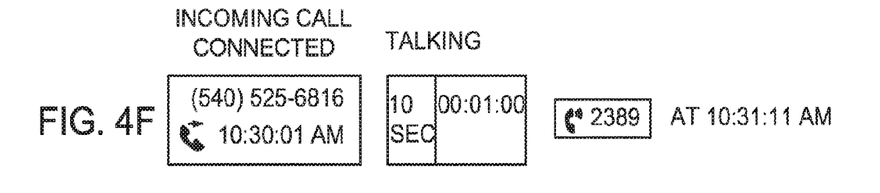
Figure 4G:
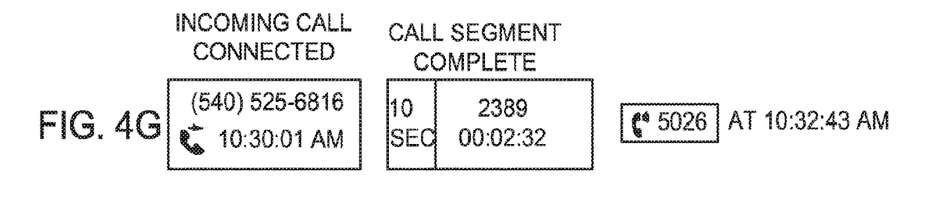
Figure 4H:
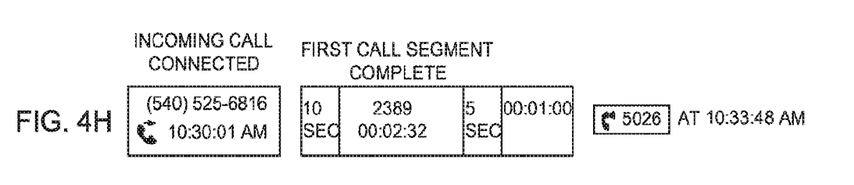
Figure 4I:
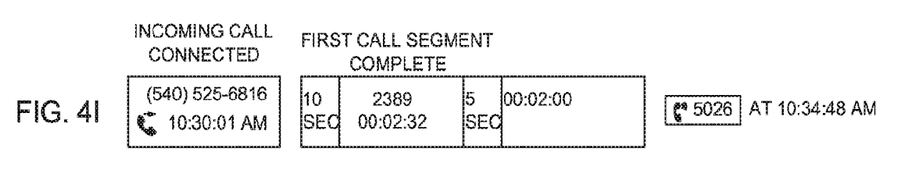
Figure 4J:
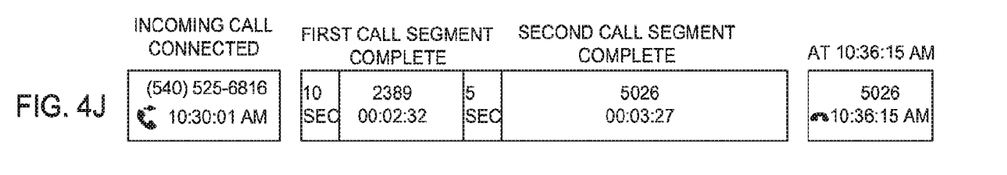

As a third example, the telephone call illustrated in FIGS. 4a-4j includes an exemplary recipient element at the end of the array of the elements, and which represents the intended recipient of the (attempted or completed) connection from the prior element. For example, in FIGS. 4a-4c, the recipient element displays the address (extension 2389) of the recipient of the intended connection from the caller element, with FIG. 4d showing completion of the connection via the change of an icon in the recipient element from an image of a ringing telephone to an image of a sound-emitting telephone. After FIG. 4d, the recipient element is displayed following the growing first call segment element (FIGS. 4e-4f), and continues to display the address identifying the recipient of the first call segment. At FIG. 4g, when the first call segment is completed (the first call segment element reaches its final length), the second call segment element then grows from the first call segment (FIGS. 4h-4i), preceded by a delay element representing a delay between the first and second call segments. The recipient element then follows the growing second call segment element, and displays the address (extension 5026) identifying the recipient of the second call segment along with the icon depicting an image of a sound-emitting telephone (signifying connection to the recipient). In FIG. 4j, the second call segment concludes to terminate the telephone call, and the recipient element continues to display the recipient's address along with the call segment end time and an icon depicting an image of a hung telephone (signifying terminated connection to the recipient).

Figure 5A:
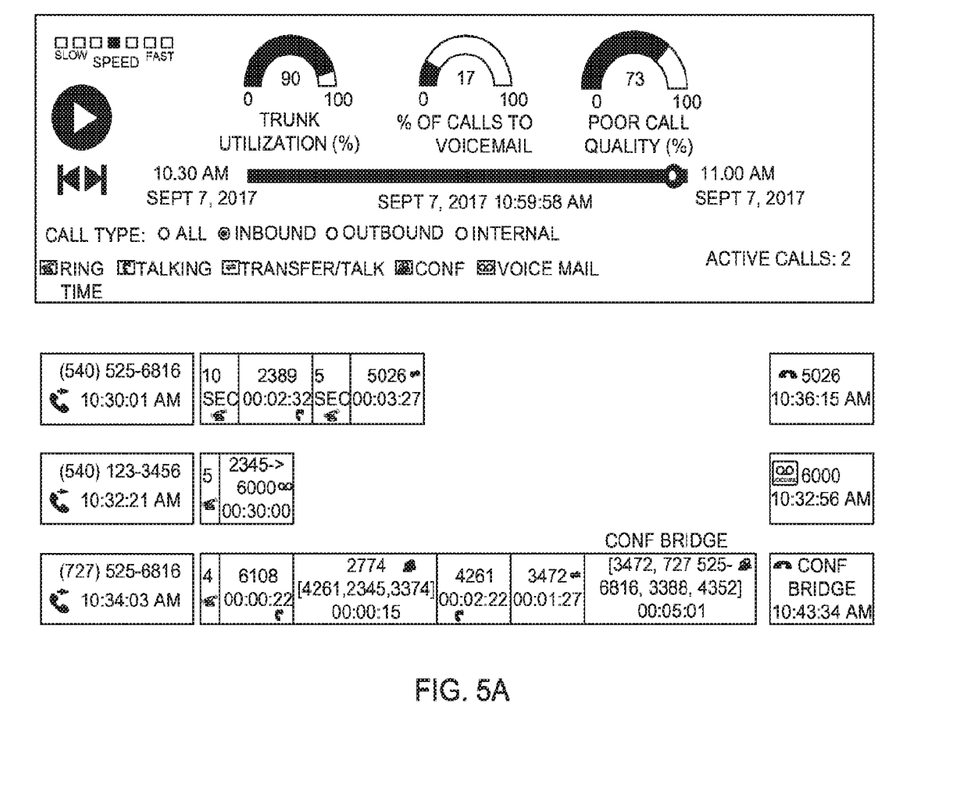
FIG. 5 schematically illustrates an exemplary display that might be provided by the invention, with an animation of several telephone calls within a telephone network being schematically depicted along with a user interface bearing controls for adapting the animation speed and the moment at (or period over) which the telephone calls are to be displayed.
Figure 5B:
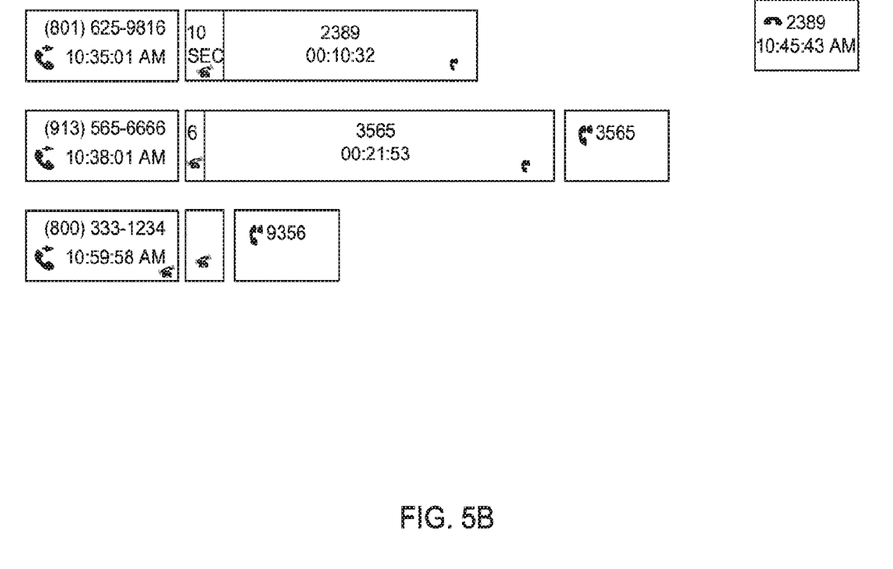
Figure 6A:
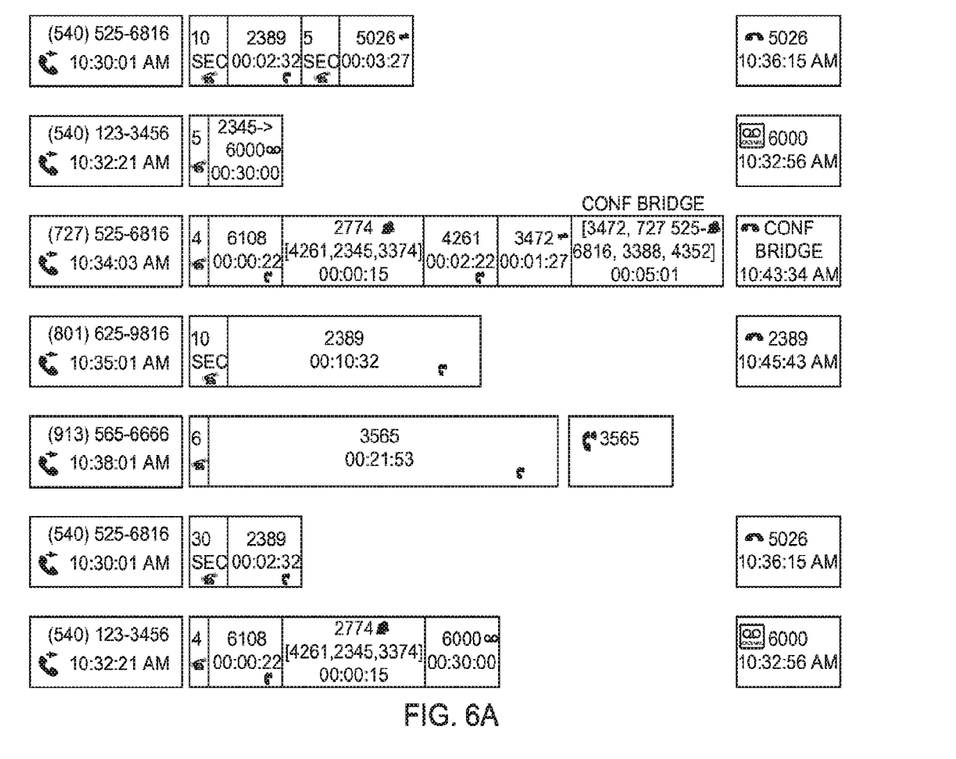
FIG. 6 schematically illustrates an exemplary display that might be provided by the invention, depicting numerous telephone calls within a telephone network over a period of time.
Figure 6B:
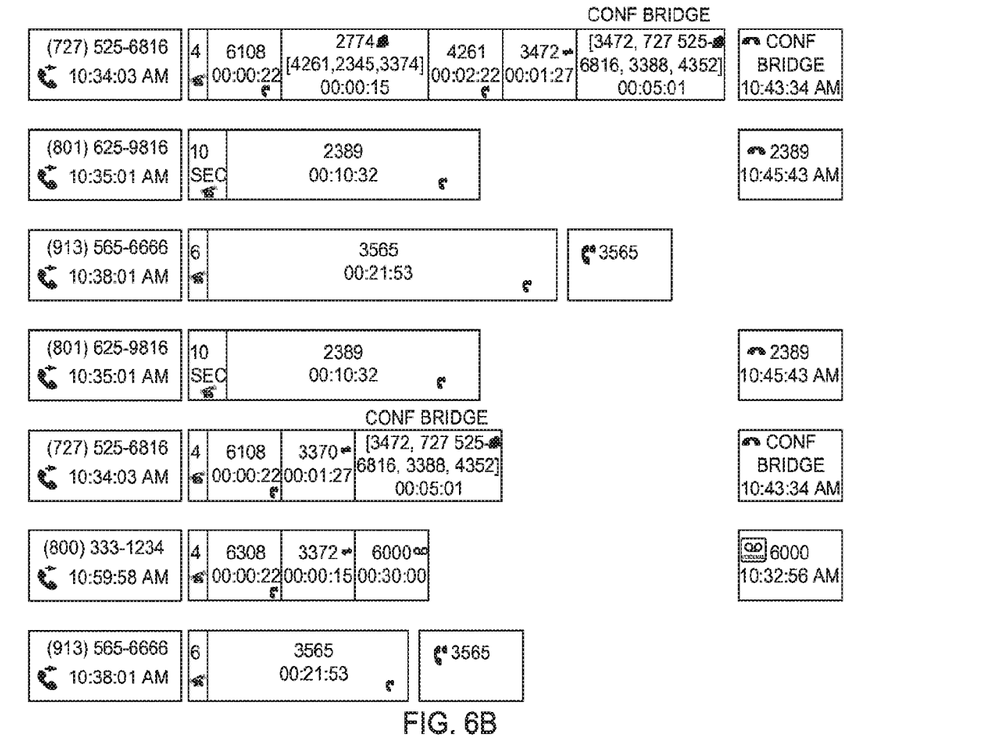
Figure 6C:
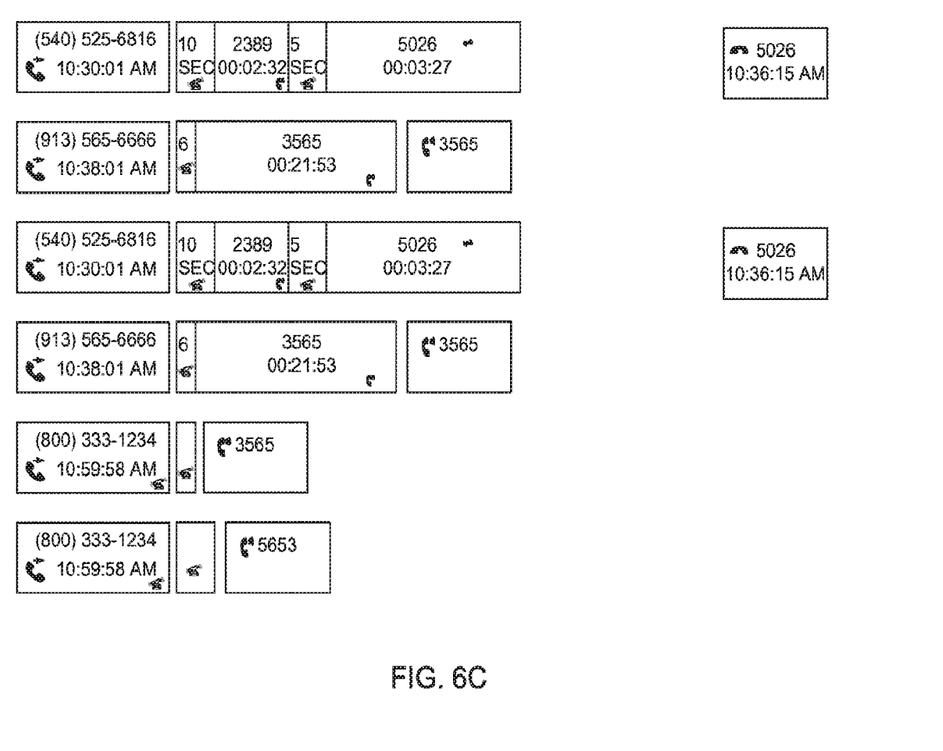

The telephone call animation exemplified by FIGS. 4a-4j is preferably done for some or all telephone calls within a telephone network, with the multiple telephone calls being simultaneously displayed on the monitor in animated form, and with the telephone calls' linear arrays of elements being displayed in parallel, as exemplified in FIG. 6. The ability to visualize the details of multiple calls at the same time is exceptionally helpful to telephone network administrators, who can then easily and intuitively grasp the performance of the telephone network. A display such as that of FIG. 6 can be provided for some or all telephone calls within a telephone network in real time, such that the call segments of the call are displayed in succession as they occur during the telephone call. For example, each of the displayed calls may expand rightwardly as they progress, and a user can scroll upwardly in the display, and/or zoom outwardly or inwardly to display more or fewer calls, as new telephone calls begin and appear at the bottom of the display. Additionally or alternatively, the system can allow playback of some or all telephone calls within a telephone network over any user-selected prior period. FIG. 5 illustrates a user interface ("dashboard") for playback of this nature, with the interface being displayed on the monitor along with the animated telephone calls. A user can index through half-hour (or other) periods via use of the index buttons, start or stop the animation via the play button, adjust the speed of the animation via selection of a desired speed level, and scroll to a desired moment within the selected period via a slider button (with the animation resuming at the selected moment). The interface further allows all calls within the telephone network (or a subsection thereof) to be shown, or the displayed telephone calls can be filtered to show only inbound calls, only outbound calls, or only calls internal to the telephone network (or a pair of these call subsets might be chosen). Telephone network metrics can also be displayed, including usage metrics such as trunk utilization and/or the number of calls going to voicemail, and call quality metrics such as an average Mean Opinion Score.

In summary, the inventive systems generate a call tracing interface which animates complete telephone call histories, from call origination to call termination, over all or portions of a telephone network (e.g., specific trunk lines), to thereby provide an intuitive and easily understandable view of a telephone network's operation over any specified time period, and/or at any specified time. The system can be used for real-time monitoring of a telephone network, or for reviewing historical data. The ability to view a call history in its entirety, in an intuitive and readily understandable manner (with animation in real time, high speed, or slow motion), greatly expedites the identification of problems and the development of solutions. The inventive systems allow the multiple concurrent calls' statuses to be simultaneously analyzed, which cannot practically be done via review of textual telephone network data. The inventive systems' features provide particularly significant advantages for (as examples):

(1) Determination of call quality issues within the telephone network;
(2) Determination of system behavior under varying loads, e.g., whether there are enough trunk lines to accept varying amounts of incoming/outgoing calls;
(3) Determining the amount of calls going to voicemail during a certain time period (e.g., at lunch time);
(4) Determining whether staff levels are adequate to support the volume of call traffic;
(5) Determining whether the agents within a hunt group are active and answering calls;
(6) Comparing multiple time periods to look for trends or patterns in the telephone network;
(7) Tracking call routing patterns and providing alternative options;
(8) Determining and comparing agent performance in a call center environment;
(9) Tracking missed calls from critical originators (e.g., critical customers or vendors);
(10) Determining the number and cause of calls going unanswered, and/or to voicemail; and
(11) Determining the cause of long caller wait/hold times.

Further advantages, features, and objects of the invention will be apparent from the remainder of this document in conjunction with the associated drawings.

DETAILED DESCRIPTION OF EXEMPLARY VERSIONS OF THE INVENTION

Expanding on the discussion above, the system preferably collects call data (such as that in FIG. 3) in real time from one or more telephone networks, telephone carriers, routers, etc., and stores the call data in a database. Call data can differ in format and content from one telephone network to another, and the data can be processed to provide uniform content and format, if necessary. This may include mapping call data to the properties configured in the telephone network(s), and/or applying processing algorithms, to identify call segments and/or transitions between call segments. As a simple example, consider the telephone call of FIG. 1. The call segments are logged as separate calls, but can be identified as parts of the same telephone call because they have the same Global Call ID. The order of the segments can be determined by looking to their connection times. The transition between the segments might, for example, be generically logged as Call Split, which may be Transfer or Conference. To more specifically determine the transition, the Terminating Number of the second call segment might be compared to the Conference Bridge number set up in the telephone network. If the numbers match, the transition is Conference; if they differ, the transition is Transfer. Similar algorithms can be applied to determine other transitions where needed.

Data processing may also be performed to determine desired quality metrics across one or more call segments, and/or across an entire telephone call. Values for latency, jitter, packet loss, Mean Opinion Score, and/or other qualities may be retrieved from the telephone network (where available), stored, and processed as desired to generate the desired metric(s).

The system then constructs and animates a schematic depiction of one or more telephone calls in the telephone network(s), as exemplified by FIGS. 4a-4j, 5, and 6. Looking at FIGS. 4a-4j in greater detail, these illustrate an exemplary animation of the call represented by the first telephone call in FIG. 3 (the first two entries identified by Global Call ID 1):

(1) In FIGS. 4a-4c, the user at address (telephone number) 540-525-6816 calls the user at address (extension) 2389 at 10:30:01 AM, with these users (addresses) being depicted by corresponding caller and recipient elements. These elements are spaced by a delay element which grows as the telephone rings at address 2389. The lack of connection (the ringing of the telephone) at address 2389 is illustrated not only by the growing delay element, but also by the fill color of the caller element, and the presence of an icon depicting a ringing telephone in the recipient element. These are not the only means for communicating connection status; as suggested earlier, the connection or other status of an element may be communicated by its color or fill pattern, border thickness or line type, element shape, image consistency (i.e., static appearance versus pulsing/flashing or otherwise fluctuating), and/or by any icons associated with the element. Thus, as another example, if the incoming call fails one or more call quality metrics, the caller element might (for example) pulse in appearance.

(2) In FIG. 4d, a connection is made to address 2389 after 10 seconds of delay (ringing). The fill color of the caller element changes, and the icon in the recipient element changes to an image of a sound-emitting telephone. The delay (ring) time may be displayed in the delay element, provided the delay element has sufficient size to accommodate such display. If the delay element is too small, the delay time might be shown in a pop-up box/balloon if the user clicks on, or situates a pointer atop, the delay element. It is noted that the display of delays is highly valuable, as these can be a key reason for inefficiencies. As an example, numerous delay elements with no following call segment elements may indicate that callers disconnected because ring time was intolerable.

(3) In FIGS. 4e-4g, the first call segment element lengthens in the direction of the growing array as the call segment proceeds to completion, with its length being proportional to the call segment's connection time. The connection time is displayed in the call segment element as described above (i.e., it can be shown within the call segment element if there is sufficient area, or may otherwise be displayed upon a user's request). FIG. 4g shows the display when the call segment ends (when the connection to address 2389 ends), and a recipient icon is displayed to show an attempted connection to address 5026.

(4) FIGS. 4h-4j show the following call segment underway after a 5-second delay element (a transfer), as address 2389 transfers the call to 5026. Following a 5-second transition delay from the transfer, address 540-525-6816 is connected to 5026 for 3 minutes and 27 seconds, at which point disconnection occurs.

In FIGS. 4a-4j, the call segment elements are color-coded to provide information about the transitions by which the call segments were entered. Other means of communicating transitions may be used instead, e.g., by displaying symbols/icons and/or text adjacent the junctures between call segment elements, and/or by providing audio cues during animation (e.g., plating particular tones for particular transitions as they are rendered on the display screen).

Where telephone call quality or call segment quality is to be a displayed metric, a preferred display is to provide a small radar graph (also known as a spider graph) when a user clicks on, hovers a cursor over, or otherwise selects a relevant element in the call. The graph may then display multiple call quality indicia (e.g., latency, jitter, packet loss, and Mean Opinion Score), each on a separate one of the graph's axes extending from a common nexus. Selection of an element may also or alternatively provide other information within or adjacent the element (where such information is available), such as the device used by the caller and/or the recipient to make the call, whether the call is an audio call or video call, the codec used for the call, whether the call was in a queue (and if so, what was the wait time), etc.

Economic/accounting data may be represented in the display as well. As examples, the cost of each call might be shown at the end of the element array representing the call, in the recipient element, or elsewhere. The cost of each call segment (or delay) might be displayed within or adjacent the corresponding element. The system might also track and account for the costs of matters such as personal calls, idle users/addresses, missed calls, calls on hold, number of calls to voicemail, etc., and such matters might be displayed apart from the schematically-illustrated telephone calls (e.g., in the user interface of FIG. 5).

FIG. 5 shows an exemplary animated display that might be seen by a user of the system, wherein each of several telephone calls is displayed in a manner similar to the call shown in FIGS. 4a-4j, and a user interface is also provided to allow the user to select the period to be animated (or the moment to be shown), the animation speed, the calls to be displayed, and so forth. (Note that the displayed calls differ from the one shown in FIGS. 4a-4j in that once a call is completed, the recipient element is moved to the right side of the display screen, thereby allowing calls completed at the currently-displayed time to be more readily differentiated from calls which are still in progress at the currently-displayed time.) While only six calls are shown (corresponding to the data depicted in FIG. 3), the animated display might show fewer or far more calls.

The first displayed call corresponds generally to the call shown in FIGS. 4a-4j.

The second call shows a completed call to voicemail. When a user clicks on, hovers a cursor over, or otherwise selects the corresponding call segment element (or the voicemail icon shown in the recipient element), voicemail information might be displayed within or adjacent the element (where such information is available), such as whether the voicemail was read or remains unread, the length of the voicemail, whether a callback was made in response to the voicemail, etc. Some of this information might simply be conveyed by the color, size, or other appearance characteristics of the voicemail icon (e.g., the voicemail icon may darken or fade in dependence on whether the voicemail has been accessed).

The third call shows a connection to a hunt group at address/number 2774, with the different hunt group members having their addresses/numbers shown in different colors or formats to illustrate their status (e.g., 4261 being shown in green to illustrate "available" status, 2345 being shown in orange to illustrate "away" status, and 3374 being shown in red to illustrate "busy" status. When the call was ringing to 2774, 4261 answered the call with a 15 second delay and the other two users were not available to accept a call. The final call segment prior to termination is a conference call, and displays the addresses/numbers of all attendees at the moment the call is depicted, with different colors, formats, or the like illustrating an attendee's status. Thus, attendee addresses/numbers may appear or disappear as attendees join or leave; an attendee's transfer to another address/number might be depicted as, for example, "3472->3800"; an attendee added to the conference by a participant-attendee rather than the host-attendee might have its address/number displayed in parentheses; and so forth. As an example, if 3372 added 3800 to the conference, these attendees might be depicted as "3372 (3800)," with 3800 being shown in parentheses because 3800 is sharing audio with 3372. If 3372 disconnects from the conference (and thus disappears from the call segment element), then 3800 will also get disconnected, and will disappear.

The fourth call shows a completed call to 2389, whereas the fifth call shows an in-progress call to 3565. The sixth call is an attempted (but not yet connected) call to 9356.

In the user interface of FIG. 5, forward and reverse buttons allow a user to index through time intervals (here half-hour intervals), and a play/pause button allows a user to play the animation of the telephone call data over the selected interval. While not depicted, a user might be able to enter some interval having desired start and finish times. A "slider button" allows a user to move to any desired moment within the interval. Speed settings allow a user to increase or decrease animation speed from a default real-time speed. The calls to be displayed may also be filtered in accordance with selected criteria, with other filter criteria being possible (e.g., selection of all calls handled by one or more specific addresses or trunks). While not shown, the interface might also allow the user to scroll through all telephone calls selected for viewing, and zoom in and out to display fewer or more of the calls.

The user interface may also display summaries of aspects of telephone network performance; in FIG. 5, these are provided by usage meters showing trunk utilization (how many concurrent calls are being handled by a trunk line), the amount of calls going to voicemail, and call quality. The usage meter displays are updated to show telephone network metrics at the time currently being animated. These usage meters (or other means of displaying metrics) may display alerts if certain conditions are met, e.g., the trunk utilization meter may turn red or flash if one or more trunks are approaching critical capacity or are overloaded. The illustrated metrics are merely exemplary, and other metrics related to call traffic, usage patterns, hunt group efficiency, etc. might be provided, and might be provided in forms other than the illustrated meters (e.g., a histogram might be displayed showing the distribution of hold times for calls on hold). The metrics, in conjunction with the display of call traffic, allow network administrators to more easily discern telephone network issues and devise solutions. For example, in FIG. 5, the usage meters depict high trunk utilization and low call quality. A network administrator might review the call traffic animation to see whether the two metrics are correlated, and whether certain call traffic events are having greater impact on one or more of the metrics.

FIG. 6 illustrates the schematic telephone calls as they might appear on the animated display if the user zooms out. When numerous calls are simultaneously depicted in this manner and animated, network administrators, human resource managers, and others can readily identify patterns and issues. The depiction of telephone calls by their call segments and delays (as well as their callers and final recipients), and the timewise "growth" of the elements representing these matters, provides an intuitive and easy way to visualize call traffic.

More advanced versions of the inventive system might incorporate machine learning to predict usage patterns based on traffic—for example, trunk line usage, voicemail usage, hunt group usage/efficiency, etc.—and recommend alternatives or solutions to issues (e.g., route pattern advice, load balancing of trunks if certain trunk lines are utilized to its max capacity while others are underutilized, voicemail port usage advice, hunt group efficiency advice, etc.). A preferred approach is to show animated call flow as in the accompanying drawings alongside an animation of the predicted performance of the telephone network if recommendations (or user-proposed solutions) are implemented. The system might also implement automated optimization of the telephone network based on machine learning suggestions.

The invention is not intended to be limited to the preferred versions of the invention described above, but rather is intended to be limited only by the claims set out below. Thus, the invention encompasses all different versions that fall literally or equivalently within the scope of these claims.

What is claimed is:

1. A method of defining an operational status of a telephone network, the method including the steps of:
    a. for a telephone call within the network, compiling:
        (1) a call segment start time, and
        (2) a call segment end time,
        for each of at least two call segments within the telephone call;
    b. graphically displaying the call segments on a monitor:
        (1) in succession over time, whereby each call segment within the call is displayed before any subsequent call segment within the call becomes visible, and
        (2) in a linear array in an order in which the call segments occurred within the telephone call.

2. The method of claim 1 wherein the call segments of each of multiple telephone calls within the network are simultaneously displayed on the monitor as recited in claim 1, with the telephone calls' linear arrays of call segments being displayed in parallel.

3. The method of claim 1 wherein the call segments are displayed in succession over time as the telephone call is being made.

4. The method of claim 1:
    a. wherein the call segments are displayed subsequent to the telephone call, and
    b. further including the step of altering a speed at which the call segments appear over time.

5. The method of claim 4 wherein the speed at which the call segments appear over time is altered in dependence on user input.

6. The method of claim 1 wherein:
    a. each call segment is displayed as an element having a length oriented parallel to the line along which the array extends, and
    b. the length of each element increases over time during a display period to a final length proportional to a duration of the call segment.

7. The method of claim 6 wherein:
a. during the display of each call segment, prior to reaching the call segment's final length, a recipient element is displayed in the array following the element of the call segment;
b. the recipient element displays an address identifying the recipient of the call segment;
c. when the call segment reaches its final length:
   (1) if the call segment is followed by a subsequent call segment, the recipient element is replaced in the display by an element representing the subsequent call segment; and
   (2) if the call segment is not followed by a subsequent call segment, the recipient element displays one or more of:
      i. the call segment end time, and
      ii. a duration of the telephone call.

8. The method of claim 6:
a. further including the step of displaying a caller element earlier in time than the display of the first element in the array, the caller element displaying one or more of:
   (1) an address identifying an initiator of the telephone call, and
   (2) an origination time of the telephone call;
b. wherein the elements of the call segments of the telephone call are thereafter successively displayed over time with the caller element being situated along the linear array.

9. The method of claim 8 wherein the appearance of the caller element changes upon display of the first call segment within the telephone call.

10. The method of claim 1 wherein:
a. each call segment is displayed as an element having a length oriented parallel to the line along which the array extends, and
b. each element displays an address identifying a recipient of the call segment.

11. The method of claim 10 wherein each element displays one or more of:
a. an address identifying the recipient of the call segment,
b. call segment start time,
c. call segment end time,
d. a duration of the call segment,
e. a cost of the call segment,
f. call status identification, and
g. call quality information.

12. The method of claim 1 wherein:
a. network metrics are displayed adjacent the call segments, and
b. the network metrics are updated over time as the call segments are displayed in succession over time, with the updated network metrics representing characteristics of at least a portion of the network at the time represented by the currently-displayed call segments.

13. The method of claim 1:
a. wherein:
   (1) at least one of the call segments is preceded or followed by a delay, the delay defining at least one of:
      i. telephone ring time, and
      ii. telephone transfer time;
   (2) each call segment is displayed as an element having a length oriented along the array, and b. further including the steps of:
   (1) graphically displaying each delay preceding any of the call segments as an element:
      i. having a length oriented along the array, and
      ii. preceding its following call segment; and
   (2) graphically displaying each delay following any of the call segments as an element:
      i. having a length oriented along the array, and
      ii. following its preceding call segment.

14. The method of claim 1 wherein:
a. each call segment is displayed as an element having a length oriented parallel to the line along which the array extends, and
b. at least a portion of each element is displayed in a color differing from the colors in an immediately preceding element in the array.

15. A method of defining an operational status of a telephone network, the method including the steps of:
a. for each of multiple telephone calls within the network, compiling:
   (1) a call segment start time, and
   (2) a call segment end time,
   for at least some call segments within the telephone call;
b. graphically displaying the telephone calls on a monitor, each telephone call being represented by a linear array of elements, each element representing a call segment within the telephone call, wherein:
   (1) the elements:
      i. are displayed in succession over time on the monitor, and
      ii. are ordered along the array,
      in the same order as the occurrence of the call segments; and
   (2) the telephone calls' linear arrays of elements are displayed in parallel.

16. The method of claim 15 further including the following steps for at least some of the linear arrays of elements:
a. graphically displaying a caller element prior to the display of the first element in the array, the caller element displaying one or more of:
   (1) an address identifying an initiator of the telephone call, and
   (2) an origination time of the telephone call;
   wherein the elements of the linear array are thereafter displayed in succession following the caller element;
b. graphically displaying a delay element in the linear array:
   (1) prior to each element of the linear array which represents a call segment preceded by telephone ring time, and
   (2) following each element of the linear array which represents a call segment followed by telephone transfer time;
c. graphically displaying a recipient element following the final element in the array, wherein the recipient element displays an address identifying the recipient of the call segment represented by the final element in the array.

17. The method of claim 16 wherein each delay element has a length oriented parallel to the line along which the array extends, wherein the length is proportional to the telephone ring time or telephone transfer time represented by the delay element.

18. The method of claim 15 wherein:
a. each element has a length oriented parallel to the line along which the array extends, and b. as each element is displayed on the monitor, its length grows over time to a final length proportional to the duration of the call segment represented by the element.

19. The method of claim 18:
a. further including the step of altering a speed at which:
 (1) the elements are displayed in succession over time, whereby each call segment within the call is displayed before any subsequent call segment within the call becomes visible, and
 (2) the lengths of the elements grow,
 on the monitor,
b. the alteration being dependent on user input.

20. A method of defining an operational status of a telephone network, the method including the steps of:
a. compiling call segments of each of multiple telephone calls within the network;

b. simultaneously displaying the telephone calls on a monitor, wherein each telephone call is represented by elements appearing:
 (1) in succession over time, whereby each element within the telephone call is displayed before any subsequent element within the call becomes visible;
 (2) in a linear array,
 (3) in the order in which the call segments occurred within the telephone call, and
 (4) each with a length oriented parallel to the line along which the array extends, wherein the length increases to a final length proportional to the duration of a corresponding call segment within the telephone call,
wherein a speed of the appearance of the elements is dependent on user input.

* * * * *